United States Patent
Andrews et al.

(10) Patent No.: US 6,363,334 B1
(45) Date of Patent: Mar. 26, 2002

(54) LINEAR PROGRAMMING METHOD OF NETWORKING DESIGN FOR CARRYING TRAFFIC FROM ENDNODES TO A CORE NETWORK AT LEAST COST

(75) Inventors: Daniel Matthew Andrews; Yihao Lisa Zhang, both of New Providence, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/255,945

(22) Filed: Feb. 23, 1999

Related U.S. Application Data (60) Provisional application No. 60/107,210, filed on Nov. 5, 1998.

(51) Int. Cl.⁷ .......................... G06F 17/50; G06F 7/60
(52) U.S. Cl. .............................................. 703/13; 703/2
(58) Field of Search ....................... 703/2, 13

(56) References Cited

U.S. PATENT DOCUMENTS

| | | | | | |
|---|---|---|---|---|---|
| 4,345,116 A | * | 8/1982 | Ash et al. | .............. | 379/221 |
| 4,991,204 A | * | 2/1991 | Yamamoto et al. | ......... | 379/221 |
| 5,459,716 A | * | 10/1995 | Fahim et al. | ............... | 370/228 |
| 5,463,686 A | * | 10/1995 | Lebourges | ................. | 379/220 |
| 5,515,367 A | * | 5/1996 | Cox et al. | ................... | 370/404 |
| 5,663,891 A | * | 9/1997 | Bamji et al. | ................... | 716/2 |
| 5,841,758 A | * | 11/1998 | Chen et al. | .................. | 370/238 |
| 5,854,903 A | * | 12/1998 | Morrison et al. | ........... | 709/249 |
| 5,881,048 A | * | 3/1999 | Croslin | ....................... | 370/228 |
| 5,987,328 A | * | 11/1999 | Ephremides et al. | ........ | 455/446 |

OTHER PUBLICATIONS

Laing; Network planning methodology and practice in China; IEEE Commm. Mag.; pp. 34–37, 1993.*

F.S. Salman et al., "Approximating the Single–Sink edge Installation Problem in Network Design," *Proceedings of the ACM–SIAM Symposium on Discrete Algorithms*, pp. 619–628 (1997).

B. Awerbuch, et al., "Buy–at–Bulk Network Design," *Proceedings of the 38th Annual Symposium on Foundations of Computer Science*, pp. 542–547 (1997).

D.B. Shmoys, et al., "Approximation Algorithms for Facility Location Problems," *Proc. 29th Annual ACM Symposium on Theory of Computing*, pp. 265–274 (1997).

A. Srinivasan, et al., "A Constant–Factor Approximation Algorithm for Packet Routing, and Balancing Local vs. Global Criteria," *Proc. 29th Annual ACM Symposium on Theory of Computing*, pp. 636–643 (1997).

* cited by examiner

*Primary Examiner*—Kevin J. Teska
*Assistant Examiner*—Hugh Jones
(74) *Attorney, Agent, or Firm*—M. I. Finston (57) ABSTRACT

A method is disclosed, for designing an access network that is to carry communication traffic between end nodes and a core network. Information is provided that describes end node locations, the level of demand associated with each end node, available trunk types and their related capacities, and a cost structure. The cost structure includes a fixed overhead cost for each trunk type, and a service charge per unit distance for each trunk type. The provided information is incorporated in a linear program to find an optimal-cost access network. The linear program is solved to obtain a provisional solution that defines the composition and usage of each link of the optimal-cost access network. For each such link, the composition is defined by a fractional level of investment (incurring a like fraction of the corresponding overhead charge) in each pertinent trunk type. The provisional solution is rounded such that each trunk in which there is a fractional investment is either removed, or replaced by a trunk in which there is an integral investment.

11 Claims, 6 Drawing Sheets

LINEAR PROGRAMMING METHOD OF NETWORKING DESIGN FOR CARRYING TRAFFIC FROM ENDNODES TO A CORE NETWORK AT LEAST COST

CROSS-REFERENCE TO RELATED APPLICATION

This application claims priority of Provisional Application Serial No. 60/107,210 which was filed Nov. 5, 1998.

FIELD OF THE INVENTION

This invention relates to telecommunication networks of the kind that comprise nodes and trunks (or links) for carrying communication traffic among the nodes. More particularly, this invention relates to methods for designing such networks; i.e., for determining the layout of the physical interconnections within the network, and for choosing the trunk types for implementing such interconnections. Still more particularly, this invention relates to optimization methods for achieving such interconnections at least cost.

BACKGROUND OF THE INVENTION

Trunks for carrying telecommunications traffic may be classified according to capacity and according to cost per mile (for purchasing or leasing the trunks). Typically, the cost per mile is not proportional to the capacity, but instead increases much less than linearly as the capacity is increased. For example, Table 1 gives a typical set of leasing prices for trunks of four types. As a consequence of such cost structures, an economy of scale is often achieved by concentrating traffic to or from relatively many nodes into relatively few trunks, at least in specific portions of a network.

TABLE 1

| Type | Capacity (kbps) | Cost (in dollars)/mile |
|---|---|---|
| DS0 | 64 | 4 |
| DS1 | 1544 | 23 |
| DS3 | 44736 | 200 |
| OC3 | 155520 | 300 |

Figure 1:
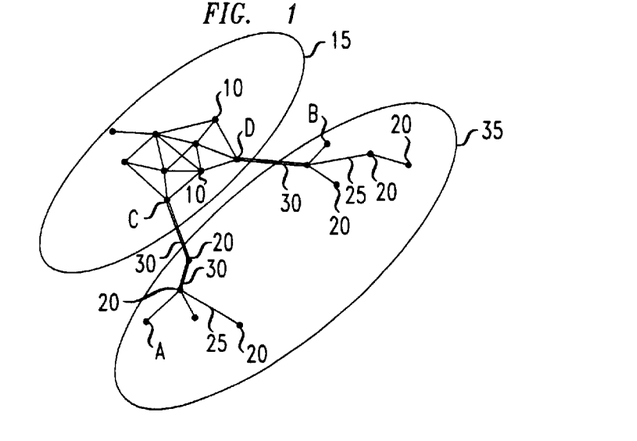
FIG. 1 is a schematic representation of an illustrative communication network of the type that includes an access network and a core network.

Some communication networks lend themselves to an access network model, in which such economies of scale may be substantial. With reference to FIG. 1, such a network consists of core nodes 10 occupying a central core 15, and a distribution of end nodes 20. Links 25 interconnect the nodes. Each link comprises one or more trunks. Each of the core nodes typically has switching capability, and the core nodes are highly interconnected.

The end nodes are connected to the core via access network 35. To achieve economies of scale, traffic from neighboring end nodes is advantageously multiplexed on to relatively high-capacity trunks 30 on its way to the core. Conversely, traffic destined for the end nodes is demultiplexed after leaving the core.

In effect, the core, as a whole, serves as a main switch for traffic between the end nodes. For example, traffic to be routed from end node A to end node B may go first from A to core node C, then across the core to core node D, and finally to end node B.

Every node that lies outside the core is referred to here as an end node, even if it is an intermediate point for traffic to or from multiple other end nodes.

Figure 2:
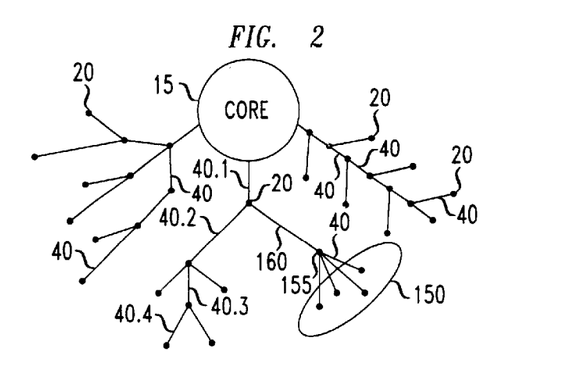
FIG. 2 is a schematic representation of a communication network of the type shown in FIG. 1, in which the access network has a tree-like structure.

As a general rule, the nodes 20 of an economically efficient access network are organized by the links into a tree-like structure, as shown in FIG. 2. (In the figure, the links are denoted by reference numeral 40.) Links in such a structure have various branching depths, such as 1, 2, 3, and 4 in the case of links 40.1, 40.2, 40.3, and 40.4 of the figure, respectively. It will be apparent from the figure that there is no unique way to define such a structure. Instead, the branching depth of the link that reaches any given end node, and the branch (or sub-branch, etc.) with which any given end node is associated, are matters of design choice. Additionally, it is a matter of design choice whether to add capacity to a link by multiplying trunks of the same type, or by substituting trunks of higher capacity.

The design choices will generally be directed toward minimizing the total cost of the access network, while accommodating the expected demand from each of the end nodes. To "accommodate demand" means to provide sufficient capacity to carry demand to or from the respective end nodes. For convenience, we will refer to this desideratum as accommodating demand from the end nodes. It should be understood, however, that the actual flow of data may be to the end nodes, from the end nodes, or bidirectional.

The cost of the access network will be determined by the lengths of the various trunks that are installed, by the number of trunks of a given type that are installed between a given pair of nodes, and by the cost structure. Thus, each design choice will have an impact on the total cost of the access network. When there are only a few nodes in the access network, it is tractable to examine the most reasonable design choices and to identify those that result in minimum cost. However, practical access networks often have many tens, hundreds, or even thousands of nodes. In such cases, it is generally necessary to use an automated procedure to find a network design having relatively low cost.

Trunks must be acquired (i.e., purchased or leased—the term purchase will be used herein to denote any type of acquisition) in whole units. Therefore, the problem of finding the least-cost network design lends itself naturally to the methodologies of integer programming (IP). The integer program is defined by the cost function to be minimized, and by the constraints to which the minimization is subject. The designer typically specifies the locations of the end nodes (thus determining the lengths of the pertinent trunks), the available trunk types, the cost structure, and the demand from each node. Conventionally, the cost structure specifies a capacity and a cost per mile for trunks of each respective type.

Unfortunately, the IP problem is NP-hard. As those versed in the relevant airts will appreciate, this implies that there can be no assurance that the optimal design has been achieved, or even approached, within any specified computation time that is practical in a commercial sense. As a consequence, IP formulations are of limited value in designing access networks of significant size.

An alternative to IP is to formulate the problem according to the methodologies of linear programming (LP). In an LP formulation, it would be permissible to purchase fractional trunks. Thus, certain strictures imposed by the IP approach are relaxed. As a consequence, the computational problem (in an LP formulation) becomes tractable.

However, such an approach can lead to inutile solutions. That is, a rounding rule could be applied to the LP solutions, which are largely expressed in terms of fractional purchased trunks, to derive realizable solutions using integral trunks. Naive applications of LP fail to constrain the problem in such a way that the optimal unrounded solution remains economically efficient after rounding.

One earlier approach to the design of least-cost networks is described in F. S. Salman et al., "Approximating the Single-Sink Edge Installation Problem in Network Design," *Proceedings of the ACM-SIAM Symposium on Discrete Algorithms* (*SODA* 1997), pp. 619–628. In that approach, which is limited to Euclidean metric spaces, a procedure of constructing successively smaller grids is used to distinguish between nodes that are relatively distant and those that are relatively close together.

Those authors were able to provide a performance bound of O(log D) for their approach, where D represents the total demand. That is, the total cost of a network designed by the method of Salman et al. is guaranteed to lie within O(log D) of the optimal cost. (The meaning of "O( . . . )" is explained below.) A performance bound is useful for choosing between design methods on a worst-case basis. However, a performance bound that is too great gives little or no assurance that, in practice, the pertinent method will give commercially desirable results.

Another such approach is described in B. Awerbuch and Y. Azar, "Buy-at-Bulk Network Design," in *Proceedings of the 38th Annual Symposium on Foundations of Computer Science*, Miami Beach, Fla., October 1997, pp. 542–547. In that approach, the authors applied a method, referred to as a tree metric embedding method, for approximating distances within the network by distances on a tree structure. Those authors provided a performance bound of $O(\log N)^2$, where N represents the number of nodes in the network.

Large total demands are often encountered in actual networks, and practical networks often include large numbers of nodes. Therefore, the performance bounds provided by the method of Salman et al. and by the method of Awerbuch et al. may, in practice, be relatively high. Therefore, what the art still lacks is an automatic method for designing access networks that provides utile solutions and is assured of approaching within some distance, independent of network size and total demand, of the design whose cost is optimal.

SUMMARY OF THE INVENTION

We have invented such a method. We have proven, with mathematical rigor, that the total cost of an access network designed by our method will lie within $O(K^3)$, and can even lie within $O(K^2)$ of the optimal cost, if the trunk costs satisfy certain conditions. These conditions are satisfied by many commercially available trunks.

The symbol K represents the total number of different trunk types. To "lie within $O(K^2)$" of a given value means to be no greater than the product of such value times a second-order polynomial in K. Similarly, to "lie within $O(K^3)$" means to be no greater than the given value times a third-order polynomial in K.

Central to our method is a transformed cost structure. This new cost structure has two components for trunks of each type. One component is a fixed overhead cost $\sigma$ of a specified number of dollars per mile. When any amount of trunk of a given type is purchased, this cost is incurred. The other component is a service charge $\mu$. The service charge is expressed as a specified number of dollars, per mile, per unit of capacity.

Let the trunk types be indexed by the positive integer k, and let k=1, 2, . . . indicate increasing order of capacity. Then the overhead cost per mile of one unit of trunk of each of the respective types will typically increase with k. If it is also true that the service charge per unit length decreases with increasing k, and if a further condition to be described below is satisfied, then the total cost of the access network will lie within $O(K^3)$ of the optimal cost.

The further condition, simply stated, is that it is economically inefficient to invest in a trunk and then use less than half its capacity. More precisely, the condition is: (a) for the first trunk type (k=1), the service charge per unit length is more than one-half the overhead charge per unit length. (b) For all other trunk types, the cost $d\mu+\sigma$ incurred per mile for routing demand d is cheaper on the next lower trunk type k−1 whenever the demand d is so small that the service charge $d\mu_k$ for routing it on a type-k trunk is less than half the overhead charge $\sigma_k$ on the type-k trunk. (In fact, the factor "one-half" could be replaced in sub-conditions (a) and (b) by any positive fraction without changing the sufficiency of this condition.)

The total cost of the access network will lie within $O(K^2)$ of the optimal cost, if yet a further condition is also satisfied. Simply stated, this condition is that the trunk overhead costs increase geometrically. More precisely, this condition is satisfied if there is a positive constant c for which:

$$\sigma_1 \leq c\sigma_2;\ \sigma_1+\sigma_2 \leq c\sigma_3;\ \ldots;\ \sigma_1+\sigma_2+\ldots+\sigma_{k-1} \leq c\sigma_k.$$

We have observed that this condition is often satisfied by practical cost structures.

Our invention involves the use of LP techniques. Our way of characterizing capacity costs affects the operation of the linear program. Specifically, when a given trunk type is purchased to effectuate a given link, one unit of overhead cost is incurred, and then a continuous quantity of capacity in that trunk type is purchased. This treatment results in solutions that can be rounded to provide useful designs.

One reason why our approach is more realistic is that our "overhead cost" builds into the linear program a penalty for routing miniscule demands on expensive (i.e., high-capacity) trunks. That is, if a given trunk is invested to carry any demand at all, no matter how small, an overhead cost must be sustained. This reflects the fact that in real life, if any demand is to be routed on a given link, the cost for purchasing at least one whole link must be incurred. (It should be noted that in the LP phase of the solution, we permit fractional overhead costs to be sustained. In a subsequent "rounding" phase, fractionally invested trunks are consolidated into whole units.) Without such a penalty, the linear program would simply buy fractional amounts of one trunk type only, namely the trunk type having the least cost per unit capacity, and it would route demand from each end node to its closest core node.

Thus, in one aspect, our invention involves a method for designing an access network, comprising a collection of end nodes interconnected by links, for carrying communication traffic between the end nodes and a core. The method includes providing information descriptive of end node locations, the level of demand associated with each end node, available trunk types and their related capacities, and a cost structure. The cost structure includes a fixed overhead cost for each trunk type, and a service charge per unit distance for each trunk type.

The method further includes incorporating the provided information in a linear program to find an optimal-cost access network. The method further includes solving the linear program, thereby to obtain a provisional solution that defines the composition and usage of each link of the optimal-cost access network.

For each such link, the composition is defined by a fractional level of investment (incurring a like fraction of the corresponding overhead charge) in each pertinent trunk type. Below, we use the symbol x to denote these investment variables.

Each link will carry demand from one or more end nodes. On the link, one or more trunks of various types may each carry a certain fraction of the demand from a given end node. The usage is defined by the fraction of the demand from each pertinent end node that is routed through each pertinent trunk type. Below, we use the symbol y to denote these usage variables.

The method further includes rounding the provisional solution, thereby to provide a rounded solution. The rounding is carried out such that each trunk in which there is a fractional investment is either removed, or replaced by a trunk in which there is an integral investment.

In specific embodiments of the invention, rounding is carried out first on trunks of the highest-capacity type, and then on trunk types of successively lower capacity. (In this regard, we will refer, below, to trunks of successively lower "order.") Within each order, the rounding takes place in three phases. Each trunk is considered to be directed toward the core.

In the first phase, referred to as "buying," groups of alternative trunks are identified. Each said group is reduced to a single trunk in accordance with a rule based on the service charge for sending one unit of demand over each of the alternative trunks to the core. (It should be noted that a single trunk is treated here as though it had unlimited capacity. Therefore, in actual implementations, such a trunk may be realized as a bundle of parallel trunks.)

In the second phase, referred to as "rerouting," the demand previously carried by each alternative trunk removed in the buying phase is rerouted on a trunk of the next lower order.

The third phase, referred to as "shortcutting," relates to each junction of two trunks of a common type. Each such trunk pair is replaced by a single trunk of the common type.

DETAILED DESCRIPTION

In accordance with our new cost structure, each trunk-type is associated with an overhead charge $\sigma$ per unit length and a service charge $\mu$ per unit length per unit bandwidth. When buying such a trunk of length l, we pay an overhead charge of $\sigma \cdot l$. Then, we pay a service charge of $\mu d$ for every unit of bandwidth that we route through this trunk. Hence, the total cost of routing d units of bandwidth for l units of distance, is $$(\sigma + \mu \cdot d) \cdot l. \qquad (1)$$

It should be noted that in this cost structure, there is no limit to the amount of bandwidth that can be routed along one particular trunk.

By contrast, a given trunk type is described in the traditional cost structure by a capacity c and a cost p per unit length. In that cost structure, the total cost of routing d units of bandwidth for l units of distance (which would require $\lceil d/c \rceil$ trunks) is $$\lceil (d/c) \rceil \times p \times l. \qquad (2)$$

The symbol pair "$\lceil \ldots \rceil$" denotes that the smallest integer greater than or equal to the enclosed quantity should be taken.

A useful comparison between the respective cost structures of Equation (1) and Equation (2) is made by identifying the overhead $\sigma$ with the cost per unit length p, and identifying the service charge $\mu$ with the capacity cost (per unit length) p/c. When that is done, the cost of a given trunk according to Equation (1) will always fall within a factor-of-two of the cost according to Equation (2). Thus, the two cost structures are comparable.

For each trunk-type k, where $1 \leq k \leq K$, we use $\sigma_k$ to represent the overhead charge and $\mu_k$ to represent the service charge. If the trunk types are placed in increasing order according to their respective overhead charges (i.e., $\sigma_1 < \sigma_2 < \ldots < \sigma_K$), then in commercially realistic situations, the corresponding service charges will be in descending order (i.e., $\mu_1 > \mu_2 > \ldots > \mu_K$), since the trunks with the highest purchase price will have the lowest service charges.

By way of example, the overhead and service charges corresponding to the trunk types of Table 1 are displayed below in Table 2:

TABLE 2

| Type | Capacity (kbps) | Cost/Mile ($/mile) | Overhead ($/mile) | Service charge ($/mile/DS0) |
|------|-----------------|--------------------|--------------------|------------------------------|
| DS0  | 64              | 4                  | 4                  | 4                            |
| DS1  | 1544            | 23                 | 23                 | 0.953                        |
| DS3  | 44736           | 200                | 200                | 0.286                        |
| OC3  | 155520          | 300                | 300                | 0.123                        |

Our linear program is usefully described with reference to FIG. 3. As shown in the figure, linear program 45 is defined by objective function 50 and constraints 55, each of which will be described below. The inputs to the linear program are: the end-node locations 60.1, in which each end node is identified by an index i; the available trunks 60.2, each identified by a link index e and a trunk-type index k; the trunk lengths 60.3, in which each length $l_e$ is indexed by a corresponding link index e; the set 60.4 of the respective demands $d_i$ from the end nodes; and the cost structure 60.5. It should be noted that the list of end-node locations will generally include zero-demand nodes, which simply pass demand through from lower-order nodes.

The variables that are to be optimized are the investment variable $x_k^e$ and the usage variable $y_{k,i}^e$, which are described below. It should be noted that both types of variables are indexed according to the pertinent trunk type and link. Additionally, for reasons to be explained below, each usage variable is indexed according to a corresponding end node i.

The outputs of the linear program are the set 65.1 of optimized investment variables $\bar{x}_k^e$ and the set 65.2 of optimized usage variables $\bar{y}_{k,i}^e$.

Both the investment variables and the usage variables are permitted to take on values in the closed interval from 0 to 1. (In fact, they are limited to such a range by the "range conditions" discussed below.) For each link e and each trunk-type k, the investment variable $x_k^e$ represents how much of trunk (e, k) is bought. (In the rounding phase, this number will be rounded to 0 or 1.) For each link e, each trunk-type k, and each node i, the usage variable $y_{k,i}^e$ represents the fraction of the total demand from endnode i that is routed through trunk (e,k). (In the rounding phase, this number will also be rounded to 0 or 1.)

One of the constraints (see below) that we impose on the linear program is referred to here as the half-utilization property (HUP). A given type-k trunk is said to be half-utilized if it carries enough demand so that the total service charge $d \times \mu_k$ is at least half the overhead charge $\sigma_k$. The HUP is satisfied if every trunk that is used is half-utilized. This constraint prevents wasteful under-utilization of purchased trunk capacity.

A second constraint is referred to here as the consecutive trunk-type property (CTTP). This constraint requires that each demand must be routed through trunks of consecutive types 1, 2, ..., up to some maximum which is at most K.

To make the CTTP enforceable, we include, in the input to the linear program, zero-length links at each node, for each trunk type. Zero-length trunks on such links can fill in gaps in the sequence of trunk types that a given flow path traverses. As a consequence, the CTTP is effectively relaxed to a requirement that trunk types must be traversed in ascending order. However, not every ascending sequence of trunk types will be permitted. If any of the zero-length trunks are less than half-utilized, they will be forbidden by the HUP. It is desirable to eliminate such trunks because to our method, they are as "real" as any other trunks. Therefore, they may ultimately be rerouted as finite-length trunks that incur substantial overhead and service charges.

Objective function 50, which is to be minimized, represents the total cost of the access network, including both overhead and service charges. The objective function OF is $$OF = \sum_e \sum_{k=1}^{K} l_e \sigma_k x_k^e + \sum_e \sum_{k=1}^{K} l_e \mu_k \left( \sum_i d_i y_{k,i}^e \right). \quad (3)$$

OF is the sum of two terms. The first of these is the total overhead charge, summed over all of the trunk types on each link. The second term is the total service charge for all demand that is carried on the access network. For a given trunk of type k on a given link e, each end node i having a flow path through such trunk contributes an amount of demand given by $d_i y_{k,i}^e$. Summing these contributions over all of the end nodes gives the total demand carried on trunk (e, k). These totals, each multiplied by the pertinent trunk length and service charge, are summed over all links and trunk types to obtain the total service charge.

Referring again to FIG. 3, the constraints are: flow conditions 55.1, utilization condition 55.2, overhead condition 55.3, and range conditions 55.4.

The range conditions, already stated, are that the investment variables and the usage variables take values only on the closed interval from 0 to 1.

The overhead condition requires that if any demand is routed through a given trunk, the overhead charge for that trunk must be paid. More specifically, this condition states that for every link, trunk type, and end node, the usage variable $y_{k,i}^e$ must be less than or equal to the corresponding investment variable $x_k^e$.

The utilization condition expresses the HUP. Mathematically, it is expressed, for each link e and trunk type k, by $$\tfrac{1}{2} \cdot \sigma_k x_k^e \leq \mu_k (\Sigma_i d_i y_{k,i}^e). \quad (4)$$

The flow conditions are defined so as to enforce the CTTP. The flow conditions may be stated as follows, with reference to distinct end nodes (i.e., any nodes other than core nodes) i and j:

(a) Given a trunk type k, k=1, 2, ..., K–1, the total flow originating from end node i that enters end node j via trunks of type k must equal the total flow originating from i that leaves end node j via trunks of type k+1.

(b) The total flow from end node i entering end node j via trunks of type K must be zero.

(c) The flow out of end node i on type-1 trunks must equal 1 if $d_i$ is greater than 0.

It should be noted in this regard that the flow from an end node i that enters or leaves a node j via type-k trunks is $$\sum_e y_{k,i}^e,$$

where the summation is taken over all links e that enter or leave node j.

Those skilled in the art will appreciate that these conditions are readily expressed as linear constraints on the usage variables $y_{k,i}^e$.

We have found that the linear program has the advantageous property that it can be solved optimally in a time span that is polynomial in the network size N and the number of trunk-types K.

Figure 3:
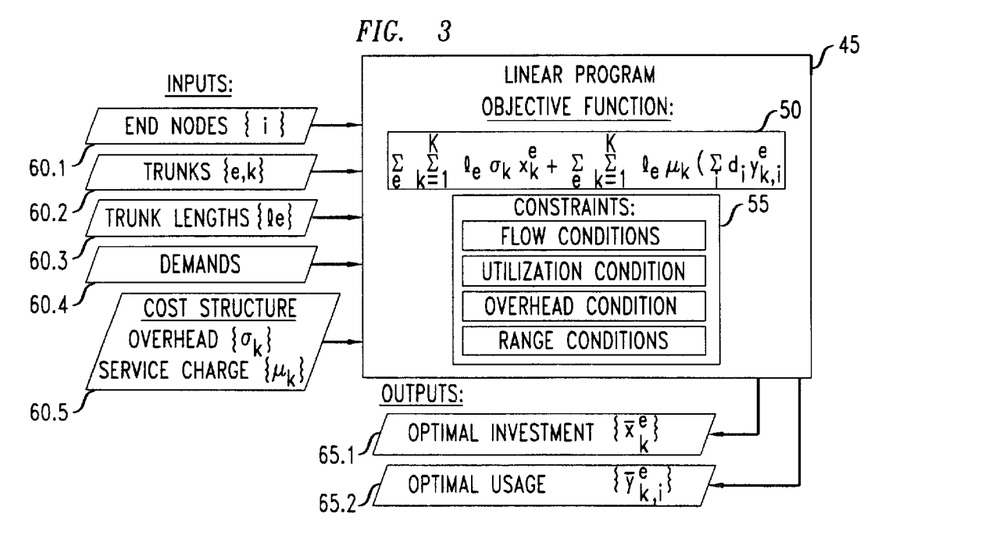
FIG. 3 is a block diagram illustrating a linear program that is to be solved in accordance with the invention in an illustrative embodiment.

The output of the linear program, as shown at boxes 65.1 and 65.2 of FIG. 3, consists of optimal values $\bar{x}_k^e$ of the investment variables and optimal values $\bar{y}_{k,i}^e$ of the usage variables, respectively. Associated with this solution of the linear program is an optimal cost. Next, each of the investment variables and usage variables is rounded to 1 or 0, thereby to provide an access-network design in which trunks are purchased in whole units, and in which all of the demand from each end node takes a single flow path to the core. As noted (and if the trunk costs increase geometrically by trunk type), the rounding procedure that we now describe will increase the optimal cost by no more than a factor that is $O(K^2)$.

A related rounding technique, for application to facility-location problems, is described in D. B. Shmoys et al., "Approximation Algorithms for Facility Location Problems," in *Proc. 29th Annual ACM Symposium on Theory of Computing*, El Paso, Tex., May 1977, pp. 265–274.

Figure 4:
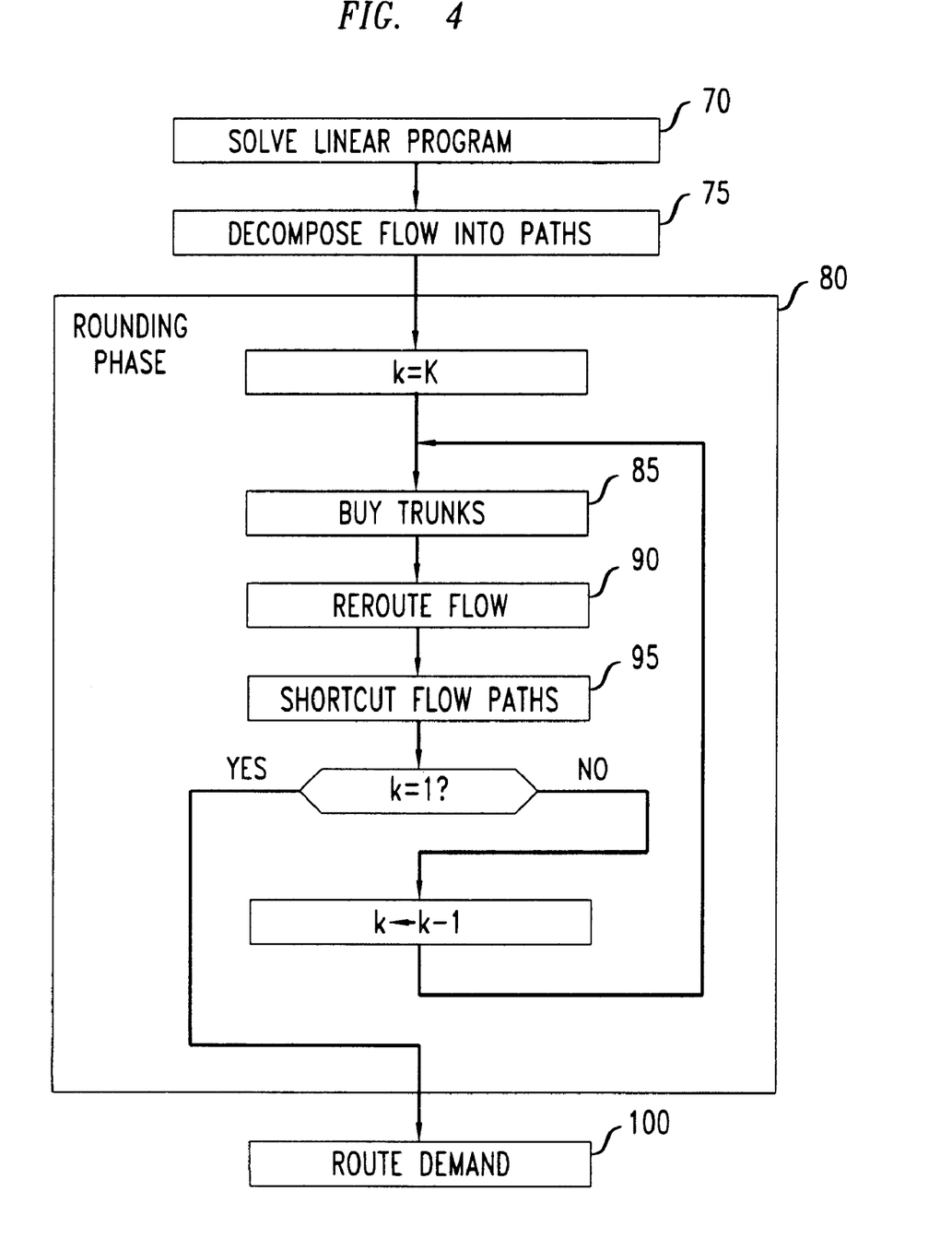
FIG. 4 is a flow chart of the steps to be followed in the practice of the inventive method, in an illustrative embodiment.

Turning to FIG. 4, the step of solving the linear program, described above, is there represented by box 70. The next step, shown as box 75, is to decompose the flow from each end node into discrete paths from the end node all the way to the core. (Strictly speaking, this step applies only to those end nodes that are sources of demand.) The next group of steps, shown as box 80, is here referred to as the rounding phase.

In the rounding phase, each investment variable is set to 0 (indicating that no trunks of the pertinent type are to be purchased for the pertinent link), or it is set to 1 (indicating that a trunk is to be purchased). This step, referred to as the buying step, is represented in the figure by box 85.

The investment variables may be set to 0 on all of the trunks leaving a given node. In such a case, flow from that node must be rerouted. The rerouting step is represented in the figure by box 90.

The rerouting step may result in some flow paths that enter and leave a given node on trunks of the same type. Each such path is replaced by a single trunk of the pertinent type. This step, referred to as the short-cutting step, is represented in the figure by box 95.

It should be noted that steps 85–95 of rounding phase 80 are repeated, in turn, for each trunk type, beginning with the largest (i.e., type K) and ending with the smallest (i.e., type 1).

After the rounding phase has been completed for trunks of each type, demand is routed from the end nodes, over the bought trunks, to the core. This routing step is represented in the figure by box 100.

At this point, the fractional values of the usage values are useful for calculating an upper bound for the total cost of the access network. However, the actual routing is carried out irrespective of these values. Instead, all of the demand from each node is simply routed along the path that incurs the least service charge. Because it will generally be possible to consolidate, on lower-cost paths, flow that was previously partially routed on higher-cost paths, the resulting total cost will be no worse than that predicted from the usage variables.

It should be noted that for purposes of routing step 100, each bought trunk is treated as having unlimited capacity. When the resulting design is placed into practice, multiple units of trunks may be purchased as needed to handle the designed amount of demand. We planned for this outcome in the design of our cost structure.

Step 75, of decomposing the flow from the end nodes into flow paths, will now be described in more detail, with reference to FIGS. 5A–5C.

It should be noted that there are well-known techniques for path decomposition. One such technique is described, e.g., in A. Srinivasan and C-P Teo, "A Constant-Factor Approximation Algorithm for Packet Routing, and Balancing Local vs. Global Criteria," in *Proc. 29<sup>th</sup> Annual ACM Symposium on Theory of Computing*, El Paso, Tex., May 1997, pp. 636–643 (see especially Section 2.2 at p. 639).

Figure 5A:
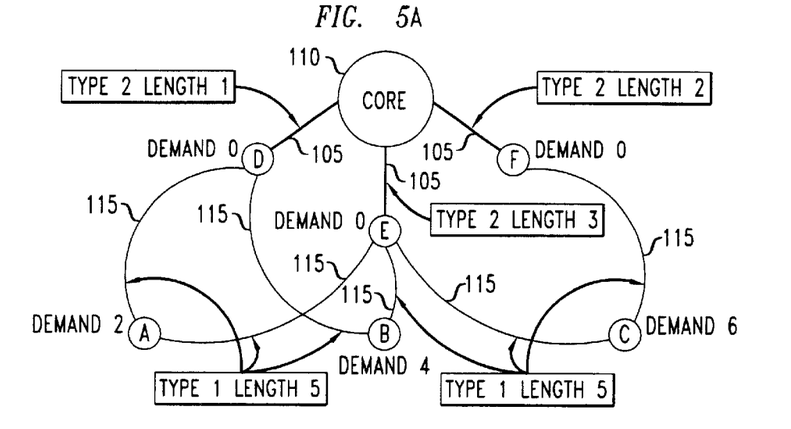
FIGS. 5A–5C illustrate, via a schematic representation of a simple network, the step of flow-path decomposition according to the inventive method in an illustrative embodiment.

FIG. 5A shows a simple access network as defined by those investment variables that are output by the linear program with non-zero values. Trunks of two types are present: type 1 and type 2. One of the type-2 trunks 105 extends from each of the nodes respectively labeled D, E, and F to core 110. Type-1 trunks extend from the nodes respectively labeled A, B, and C to nodes D, E, and F as follows: from A, one trunk to D and one to E; from B, one trunk to D and one to E; from C, one trunk to E and one to F. The type-2 trunks from D, E, and F have respective lengths 1, 2, and 3. All of the type-1 trunks are of length 5. No demand comes from nodes D, E, and F. Node A has demand 2, B has demand 4, and C has demand 6. The trunk types, trunk lengths, and demands are inputs provided by the designer to the linear program.

Figure 5B:
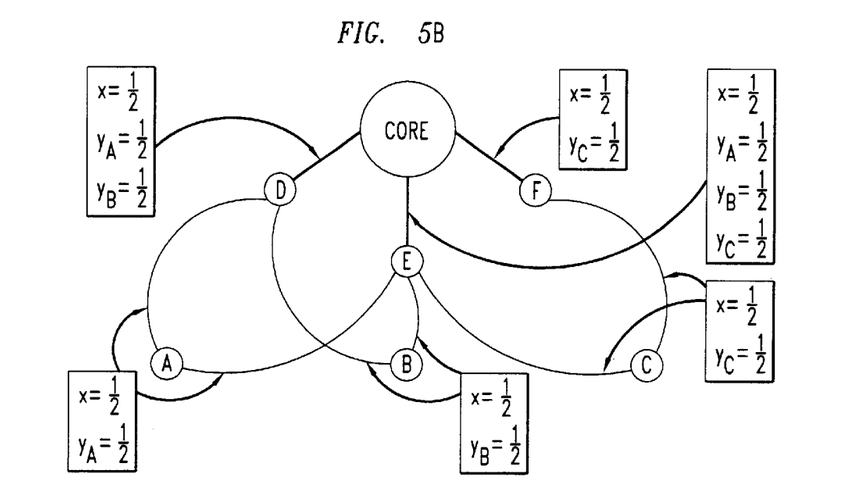

The network of FIG. 5A is repeated in FIG. 5B. Indicated in FIG. 5B are the values of the investment variables and usage variables provided by the output of the linear program. For clarity, the trunk-type indices and link indices have been suppressed, and only the node indices (i.e., A, B, and C) have been retained in the figure. As shown in the figure, the investment variable is valued at ½ for all trunks. Half of the demand from A is carried on each of the two trunks that terminate on it, and similarly for the demand from B and C. The type-2 trunk from D carries half of the demand from A and half of the demand from B. The type-2 trunk from E carries half of the demand from each of A, B, and C. The type-2 trunk from F carries half of the demand from node C only.

Figure 5C:
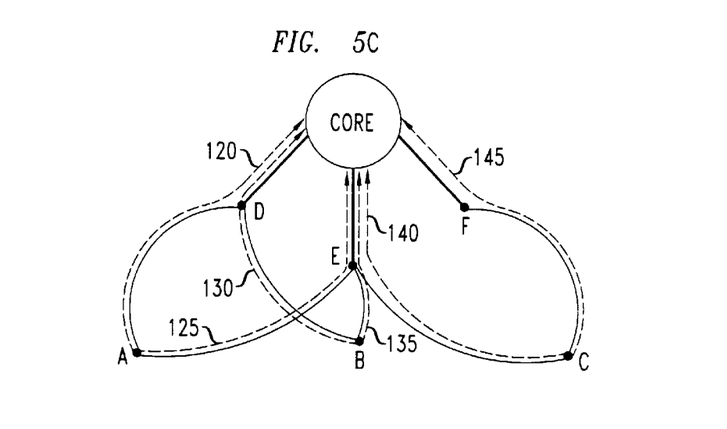

FIG. 5C shows a path decomposition for this network. Each of paths 120 and 125 carries a fraction $f_P = ½$ of the demand from node A, each of paths 130 and 135 carries a fraction $f_P = ½$ of the demand from node B, and each of paths 140 and 145 carries a fraction $f_P = ½$ of the demand from node C.

Each path P from a given end node is chosen so that it follows a sequence of trunks of consecutive ascending types. Advantageously, paths are defined one at a time, by considering the values of the usage variables on the pertinent trunks. According to an exemplary procedure, the trunk having the smallest usage variable is found. A path including that trunk is traced. All of the demand described by that usage variable is imputed to that path. The imputed amount of demand is subtracted from all other trunks (on that flow path) carrying demand from the given node. Then, the procedure is repeated until all flow from the given node is accounted for.

We have found that the path-decomposition procedure has the advantageous property that it can be performed automatically within a time span that is polynomial in the network size N and the number of trunk-types K. (The network size may be characterized by the number of nodes or, alternatively, by the number of links.)

As noted, $f_P$ is the fraction of the demand from a node i that is carried on a given path P. A service charge sp for sending one unit of demand over path P is easily calculated by accruing the respective service charges over all the trunks comprised by path P.

A useful quantity, which will be important in the rounding phase to be described below, is $g_i$, which represents the total service charge of sending one unit of demand from endnode i, when all the alternate paths are taken into account. That is, $g_i$ is computed by summing, over all paths from node i, the products $f_P \times s_P$:

$$g_i = \sum_P f_P s_P. \qquad (5)$$

We have found that a distinction is usefully made between paths, depending on the respective values of sp and $g_i$. If routing demand only on a given path would incur no more than twice the service charge represented by $g_i$, the given path is said to be short. Otherwise, the given path is said to be long. That is, path P from end node i is short if $s_P \leq 2g_i$, and long otherwise.

The long paths together will carry less than half of the demand from end node i. However, the HUC forbids the straightforward rerouting of flow from long paths to short paths, lest the rerouting cause trunks on the long paths to become underutilized.

With reference back to FIG. 4, we turn now to rounding phase 80. As noted, the rounding is conducted in K stages, beginning with trunk type K and continuing with successively smaller trunk types. During each stage (with current trunk type k), we decide whether or not to buy a whole type-k trunk for each link e, and we perform rerouting and shortcutting as mentioned above, and discussed in greater detail below.

At the end of each stage (with current trunk type k), we require the following rules to be satisfied:

(a) For all links and all trunk types of k or higher, the current values of the corresponding investment variables $\bar{x}_k^e$ must be integral (i.e., each must be 0 or 1).

(b) For all links, all trunk types, and all nodes, the current values of the corresponding investment variables $\bar{x}_k^e$ and the corresponding usage variables $\bar{y}_{k,i}^e$ must satisfy the flow conditions, the range conditions, and the overhead condition.

(c) For all links, all nodes, and all trunk types less than k, the current values of the $\bar{x}_k^e$ and $\bar{y}_{k,i}^e$ must satisfy the HUC.

The route of a given flow path may be modified during rounding, as noted above. However, each flow path must still start from the original starting node, and it must still end at the core. If a flow path P carries a fraction $f_P$ of the demand from endnode i due to the path decomposition, then flow path P will still carry the same fraction of the demand after rounding.

Two flow paths may be merged, during rounding, onto the same route. However, they will still be treated as distinct flow paths. It should be noted, however, that the investment variable on each trunk must be at least as great as the sum of the demand fractions $f_P$ for all paths P that originate on the same end node and pass through that trunk.

One effect of the rounding phase is to convert a highly interconnected network structure to a tree-like structure as shown, for example, in FIG. 2. At each level of such a structure, there tend to be clusters of nodes (such as cluster 150 of FIG. 2) that connect to a common node of higher order (such as node 155), and from there share a common link (such as link 160) to the next higher level of the network.

Thus, once a trunk of a given type has been designated for purchase, it is desirable for the rounding procedure to segregate a cluster of nodes that may all place demand on that trunk. Once such a cluster has been found, it is marked for removal (for the time being) from further consideration.

For this purpose, we introduce a concept of eligibility. When a trunk is designated for purchase, it is designated for a particular node, which we refer to as a leader. All end nodes are initially eligible, but once a trunk has been designated for purchase, the leader is removed from the eligibility list. Also removed from the eligibility list are all the other nodes, referred to as followers, that are to be clustered with the leader. (As a consequence, no follower can ever be a leader. Moreover, once a node becomes a follower of a given leader, it can never be a follower of any other leader.) This process is described in greater detail below.

A trunk that has been designated for purchase is referred to as a candidate. Significantly, a trunk (of the current type k) can be a potential candidate only if it lies on a short path (as defined above) from the end node which is the current leader. However, if any short path from the leader passes through no type-k trunk (i.e., it passes only through trunks of types less than k), then we treat the core node at the end of that path as a potential candidate.

Each potential candidate has an associated cost, which we refer to as the potential candidate cost, given by the product of its length times its overhead charge $\sigma_k$. If the potential candidate is a core node, its potential candidate cost is zero.

Figure 6:
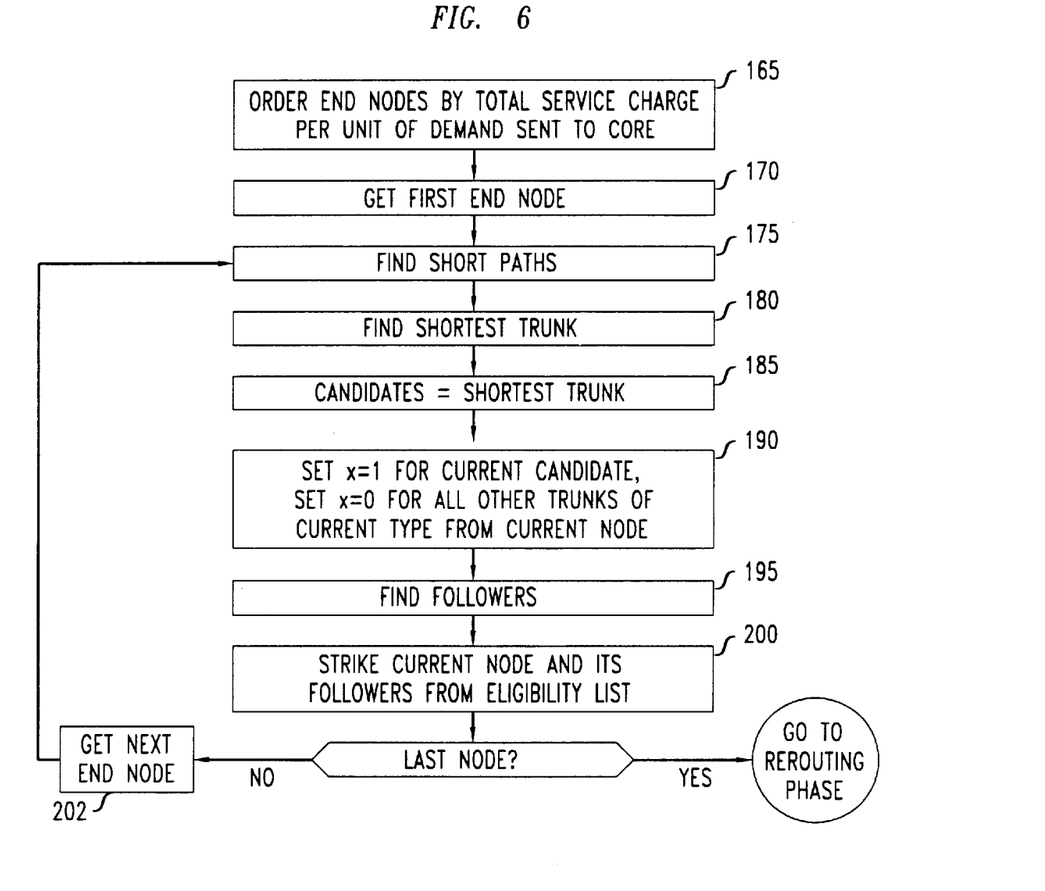
FIG. 6 is a flow chart illustrating, in expanded detail, the buying step of FIG. 4.

With reference to box 150 of FIG. 6, the buying step begins by ordering the end nodes in increasing order of $g_i$. An illustrative example of the computation of $g_i$ is now provided with reference to the network of FIGS. 5A–5C.

First compute the respective values of sp for paths 120–145. For each path, sum the product of length times service charge over all links in the path. For illustrative purposes, let the type-1 service charge be 2, and let the type-2 service charge be 1. Then for path 120, $s_P$ is 5×2+1×1=11. For path 125, $s_P$ is 12. For path 130 it is 11, and for path 135 it is 12. For path 140 it is 12, and for path 145 it is 13.

Next, obtain, for each end node, the weighted sum of the pertinent sp values, with $f_P$ as the weight coefficient. (In the example, all weight coefficients are ½.) The result is $g_i$. Thus, $g_i$ for node A (the result of summing over paths 120 and 125) is 11½. The result for node B (summing over paths 130 and 135) is also 11½. The result for node C (summing over paths 140 and 145) is 12/½.

An advantageous rule for dealing with ties is to break them arbitrarily. Applying such a rule, the end nodes are placed in the order ABC.

Turning again to FIG. 6, the next step (as shown at box 170) is to identify the eligible node with the smallest $g_i$. In the example, this is node A. As indicated at box 175, the next step is to identify all short paths from the current node. In the example, these are paths 120 and 125. Each type-k trunk on one of these paths is a potential candidate. (As noted, a core node may also be a potential candidate if there is a short path that passes through no type-k trunk.)

To continue the example, let the current value of k be 2. For illustrative purposes, let the type-1 overhead charge be 1, and let the type-2 overhead charge be 4. With reference to FIG. 5C, the potential candidate cost (that is, the product of the overhead charge per unit length, times the length) of the type-2 trunk from node D is 4. The potential candidate cost of the type-2 trunk from node E is 8, and that of the type-2 trunk from node F is 12.

Turning again to FIG. 6, the next step 180 is to find the potential candidate having the least potential candidate cost. In the example of FIGS. 5A–5C, in which there are no zero-cost candidates, this step would be equivalent to finding the shortest of the three type-2 trunks. As shown at box 185, the potential candidate of least cost becomes the candidate. In the example, the candidate is the type-k trunk from node D.

Figure 7:
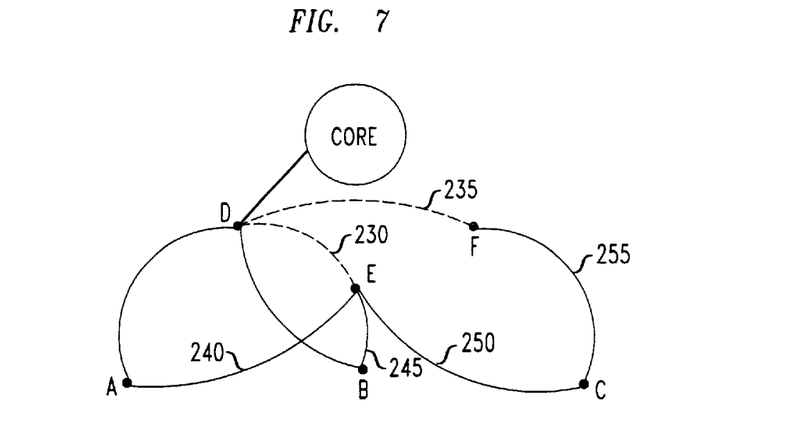
FIG. 7 represents the network of FIGS. 5A–5C, as modified after the buying step has been carried out, in accordance with the invention, for trunks of a particular type.

As shown at box 190 of FIG. 6, the investment variable is set to 1 for the candidate, and it is set to 0 for all of the other potential candidates. (The investment variable is 0 for type-k trunks that lie only on long paths.) In the example, the result would be as shown in FIG. 7.

Figure 8:
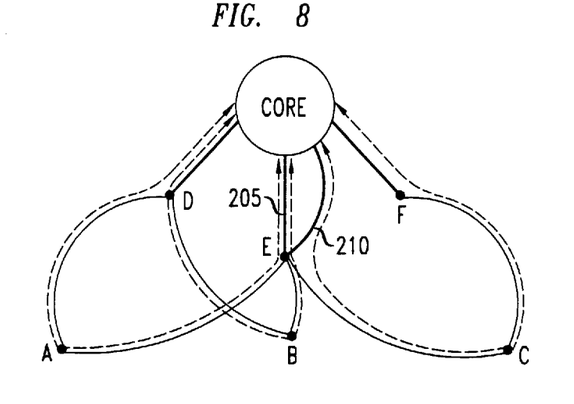
FIGS. 8–10 are schematic representations of further simple networks, offered in further illustration of the buying step.

The concept of follower is now discussed in greater detail, with reference to FIG. 8. The network of FIG. 8 is similar to that of FIG. 5C, except that the flow paths from nodes A and B now have no trunk in common with either of the flow paths from node C. Instead, the flow from C that was previously shown routed through trunk 205 is now shown routed through trunk 210.

Node E lies at the base of a type-2 trunk, namely trunk 205, that carries demand from node A. Node B sends demand to node E. This is sufficient to make B a follower of A. Node C also sends demand to node E. This is sufficient to make C a follower of A, even though the respective demands from A and C share no common trunks.

More generally, if a short path from end node i passes through a type-k trunk having base node X, then an eligible node i' becomes a follower of i if a short path from i' passes through node X.

Turning again to FIG. 6, the next step 195 is to find all of the followers of the current leader. Then, as shown at box 200, the current leader and all of its followers are stricken from the eligibility list. The next eligible end node is then identified (box 202), and the process is repeated from box 175. After the last eligible end node has been processed, the buying step terminates, and we proceed to the rerouting step (box 90 of FIG. 4).

Often, more than one type-k trunk will be available to carry rerouted demand. We base our selection of the best such trunk on the service charge incurred by the rerouting. The best trunk is that which incurs the least service charge. The trunks from which we may choose are referred to as being accessible.

Figure 9:
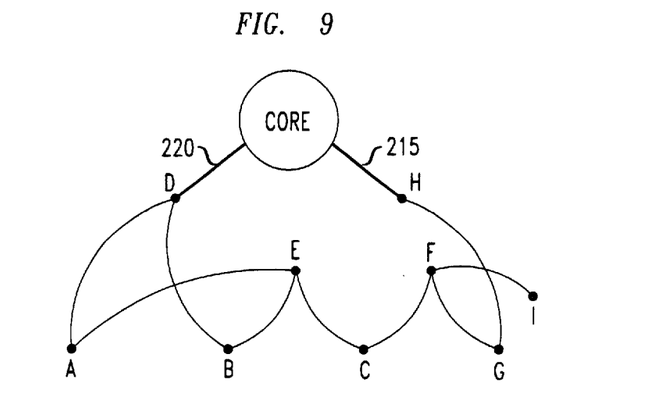

The concept of accessibility will now be explained with reference to FIG. 9. The network of FIG. 9 is similar to the network of FIG. 5C, except that new finite-demand end nodes G and I have been introduced, and new zero-demand end node H has been introduced. Nodes G and I are not followers of node A. Demand from nodes G and I flows into node F on type-1 trunks. Demand from node G flows into node H on a type-1 trunk, and from node H to the core on type-2 trunk 215. Trunk 215 is a candidate for nodes G and I.

Consider all end nodes from which flow paths (long or short) enter node F along a type-1 trunk. These are nodes C, G, and I. Then if any type-2 trunk is a candidate of any of these end nodes, it is accessible to node F. In the example, trunks 215 and 220 are accessible.

Figure 10:
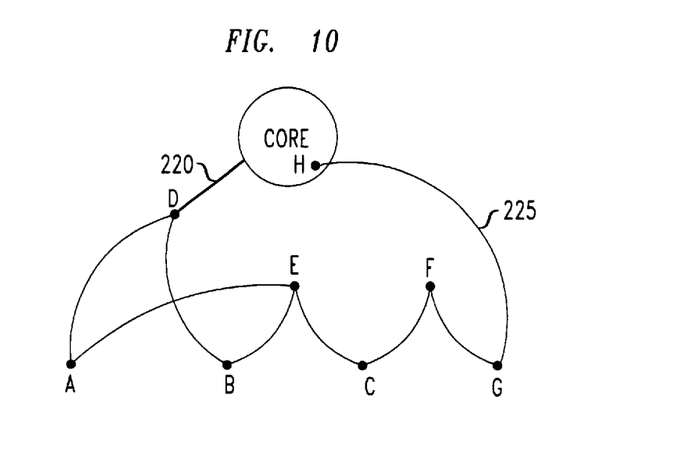

Another example is provided by FIG. 10. FIG. 10 is similar to FIG. 9, except that node I has been omitted, trunk 215 has been omitted, and node H has been moved into the core. Type-1 trunk 225 carries demand from node G to node H. Node H is now the candidate of node G. Node H and trunk 220 are accessible to node F.

More generally, consider all the flow paths, long or short, that enter a node U via some type-(k−1) trunk. If these flow paths originate from a set S of end nodes, then all the candidates of end nodes in S are accessible to U.

We compute a potential rerouting cost for each candidate that is accessible to node U.

First, suppose that the candidate is a type-k trunk having a base node W. Find a short path P' from a leader end node i' that passes through the candidate. Then the potential rerouting cost is the service charge for sending one unit of demand from node U to the core by first routing a type-(k−1) trunk from U to W, and routing from W to the core along path P'.

Next, suppose that the candidate is a core node W. Then the potential rerouting cost is the service charge of sending one unit of demand along a type-(k−1) trunk from U to W.

We choose the candidate that incurs the least potential rerouting cost. All flow paths that enter node U via a type-(k−1) trunk are rerouted to the chosen candidate via a type-(k−1) trunk.

An example of rerouting is provided in FIG. 7. There, demand from node E is rerouted to node D on type-1 trunk 230, and demand from node F is rerouted to node D on type-1 trunk 235.

Turning again to FIG. 4, rerouting step 90 is followed by shortcutting step 95. The results of the rerouting step may violate the flow conditions by specifying a flow path that follows trunks of type k−1 on two consecutive links. In the shortcutting step, each such pair of successive trunks is replaced by a single trunk.

More specifically, suppose that there is only one outgoing type-(k−1) trunk from node U, and suppose that this trunk terminates on node W. Then each incoming trunk of type k−1 (in combination with the outgoing trunk) is replaced by a shortcut. Each shortcut is a new type-(k−1) trunk that terminates on node W instead of node U.

Figure 11:
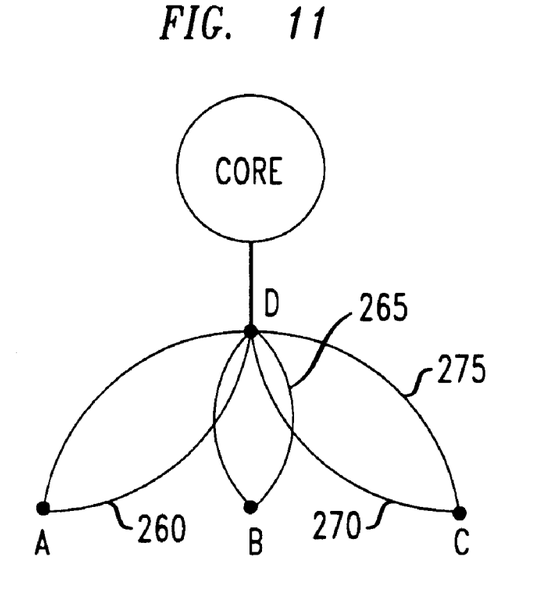
FIG. 11 represents the network of FIG. 7, as modified after the short-cutting step has been carried out, in accordance with the invention, for trunks of a particular type.
Figure 12:
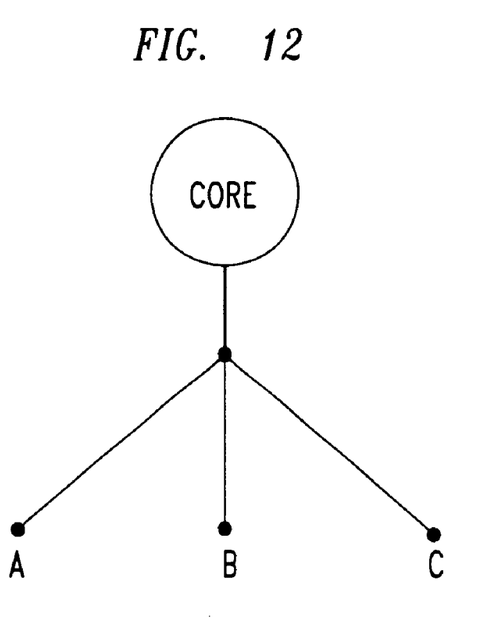
FIG. 12 represents the network of FIG. 11, as modified after all rounding, in accordance with the invention, has been completed.

An example is provided by comparing FIG. 7 with FIG. 11. Type-1 trunks 230 and 235, which terminate on node D, are deleted. Type-1 trunks 240 and 245, which originate, respectively, on node A and node B, and terminate on node E, are replaced, respectively, by type-1 trunks 260 and 265, both terminating on node D. Type-1 trunks 250 and 255, which originate on node C and terminate, respectively, on nodes E and F, are replaced, respectively, by type-1 trunks 270 and 275, which both terminate on node D. In the next stage of rounding, duplication of type-1 trunks between given node pairs will be eliminated, leading to the network structure of FIG. 12.

When a trunk is replaced during the shortcutting step, the investment variable of the old trunk is set to 0, and the investment variable of the new trunk is set to 1. For all trunks of type k−1 or greater, we also set the values of the usage variables to reflect the change in the flow paths due to rerouting and shortcutting. This assures that the flow conditions remain satisfied.

Because each shortcut (of type k−1) takes the investment-variable value of the incoming trunk that it replaces, the overhead condition remains satisfied for type-(k−1) trunks. The investment variable for any trunk of higher type will be valued at either 0 (in which case no flow is routed) or 1. For any trunk of lower type, the flow does not change (as a result of the current stage of the rounding phase). Thus, the result of each stage of rounding satisfies the overhead condition.

Finally, because each shortcut is of the same trunk type as the incoming trunk that it replaces, and because the HUC was satisfied for the incoming trunk, the HUC will also remain satisfied.

Turning again to FIG. 4, after all stages of the rounding phase have been completed, demand is routed from the end nodes to the core. The entire demand from each end node is routed along that path which incurs the least service charge.

The methods that we have discussed above pertain to the access network, without addressing issues relating to the design of the core. A further desideratum is to design the placement of the core nodes so as to minimize the switching cost in the core. Our methods can be extended to achieve such designs.

Let the core nodes be indexed by the positive integer j. We introduce a new variable $z_j$, which we refer to as the core variable. The core variable takes on values in the closed interval from 0 to 1. After rounding, a core-variable value of 1 will indicate that node j is accepted as a core node, and thus, that a switch is placed there. Similarly, a rounded value of 0 will indicate that node j is rejected as a core node.

In the linear program, the objective function OF is augmented by adding to it the following term:

$$\sum_j c_j z_j.$$

Here, the symbol $c_j$ represents the cost of placing a switch at node j. Thus, the added term represents the total switching cost for the core network. It should be noted in this regard that there may be a tradeoff between the core network and the access network. For example, increasing the number of core nodes (and thus increasing the cost of the core network) may reduce the cost of the access network.

Two additional constraints are imposed on the linear program. The Core Variable Range Condition, already stated, is that the core variable takes on values in the closed interval from 0 to 1. The Switching Cost Condition (SCC) assures that if some flow ends at a core node j, then the pertinent switching cost at node j is paid.

More precisely, the SCC may be stated in terms of the respective sums, over all trunks entering and all trunks leaving core node j, of the respective usage variables $y_{k,i}^e$. There will be respective such sums corresponding to each end node i. The SCC is satisfied if for each pair consisting of an end node i and a core node j, the excess of the entering sum over the leaving sum is no greater than the core variable $z_j$. Stated mathematically, the SCC is that, for all pairs ij:

$$\sum_{\substack{trunks\,(e,k)\\entering\,j}} y_{k,i}^e - \sum_{\substack{trunks\,(e,k)\\leaving\,j}} y_{k,i}^e \le z_j. \quad (6)$$

The linear program is solved to obtain optimal values for the investment and usage variables, as before, and also to obtain optimal values for the core variables. The investment and core variables are rounded for the respective trunk types in stages, as explained above. Each of the core variables $z_j$ is fanned out to a plurality of K variables (referred to as core-test variables) $z_{1j}, z_{2j}, \ldots, z_{Kj}$. Each of these is initially set to the optimal (fractional) value of the corresponding core variable. Then, during the stage in which type-k trunks are rounded, each pertinent core-test variable $z_{kj}$ is rounded (for all core nodes j) according to the following rules:

(1) If a short path from some end node ends at core node j via a type-(k−1) trunk, then $z_{kj}$ is rounded to 1.

(2) If some fraction of the respective demand from each of one or more end nodes i reaches core node j via trunks of type less than k−1, the greatest of all such fractions may be no more than $z_{k-1,j}$.

At the end of the rounding procedure, a switch is bought at node j if any of the corresponding core-test variables $z_{kj}$ is rounded to 1. Node j thus becomes a whole core node. If none of the corresponding core-test variables is rounded to 1, then no switch is bought at node j.

In our earlier discussion of the buying step, we pointed out that at a given rounding stage, a short path might be found that passes from an end node to the core only through trunks of types less than the current trunk type. We now refer to such paths as "Category 2 paths." Previously, the core node at the end of a Category 2 path was treated as a potential candidate with a potential candidate cost of 0.

Now, such a core node j is to be treated as a potential candidate with a potential candidate cost of $c_j$ (i.e., it is set equal to the switching cost). If a short path of an eligible end node i' reaches core node j via a trunk of type less than k, then i' becomes a follower of i.

As before, the potential candidate that incurs the least potential candidate cost becomes the candidate for i and all of its followers.

Optimal investment variable $\bar{x}_k^e$ is rounded to 1 if link (e, k) is a candidate, and to 0 otherwise.

Core variable $z_{k,j}$ is rounded to 1 if core node j is a candidate, and to 0 otherwise.

The rerouting and short-cutting steps are essentially as described above. For each node u, consider all the flow paths that enter u via trunks of type (k−1). These paths are rerouted to the core via the best accessible candidate for u. A trunk of type (k−1) is put down from u to its best candidate. This assures that each of these flow paths will either pass through a whole trunk (e,k) (i.e., through a trunk whose investment variable has the value 1), or else will terminate, via a type-(k−1) trunk, at a core node j whose core variable $z_{k,j}$ has the value 1.

As explained above, as a result of the short-cutting step, each pair of consecutive type-(k−1) trunks is replaced by a single type-(k−1) trunk.

The computational procedures described above will typically be carried out by a digital computing device, such as a general purpose digital computer, dedicated digital processor, or the like, under the control of an appropriate computer program. Such a computing device may be situated in, for example, an office of the network operator, or in a network switching terminal.

The demand values d that serve as input to the linear program may be from various sources, including measurements of demand, and theoretical models of demand.

After there are obtained optimized and rounded values of the investment and usage variables (and of the core variables, if applicable), it will often be desirable to put the resulting network design into practice by furnishing the indicated link capacities of the relevant types. In some cases, such furnishing will be carried out by the physical installation of trunks. In other cases, such furnishing will be carried out by the sale or lease of installed trunks.

In yet other cases, such furnishing will be carried out by using network management software to define a virtual network. In such cases, link capacities in various classes are allocated to the purchaser by, e.g., setting appropriate parameters in the digital memories of network management devices.

In one typical scenario, the methods described here for designing the access network are carried out by a digital computer associated with the centralized provisioning system of a network operator. The centralized provisioning system then issues requests to the individual switches of the network, directing the appropriate links and bandwidth allocations to be made. Co-located with each switch is a digital access cross-connect system (DACS). The requests issued by the centralized provisioning system cause parameters to be set at each DACS. In response, the DACSs implement the requested network design by setting up cross connections for the network switches.

The invention claimed is:

1. A method for designing an access network for carrying communication traffic between a collection of end nodes and a core network, the method to be carried out in response to input information that describes: end-node locations, a level of demand associated with each end node, available trunk types and capacities associated therewith, and a cost structure, the method comprising:

a) solving a linear program subject to a cost structure specified by an overhead charge σ per unit length and a service charge μ per unit length per unit bandwidth for each trunk type, thereby to obtain a provisional solution, wherein: (i) the provisional solution specifies, in terms of continuously valued variables, a set of links for the access network and a set of trunk types composing each link, said links and trunk types defining a network that will theoretically carry the levels of demand associated with the end nodes at a least cost; (ii) the provisional solution comprises a set of continuously valued investment variables $x_k^e$ and further comprises a set of continuously valued usage variables $y_{k,i}^e$; (iii) each investment variable $x_k^e$ specifies a level of investment in a trunk (k,e) of a respective type k on a respective link e; and (iv) each usage variable $y_{k,i}^e$ specifies a fraction of the demand from a respective end node i that is to be carried by a trunk of a respective type k on a respective link e; and b) in a rounding phase, rounding the investment variables $x_k^e$ and the usage variables $y_{k,i}^e$ to integer values, thereby to specify a practically realizable network design.

2. The method of claim 1, wherein the trunk types have an order from lowest to highest, and the rounding phase comprises, for each trunk type in succession beginning with the type of highest order:

a) in a buying stage, among trunks of the current type, identifying reducible groups of trunks, and eliminating all but one trunk of each said group, whereby each said group is reduced to a single trunk;

b) rerouting demands from eliminated trunks onto trunks of a type whose order is next below the current type; and c) if any trunk of the current type flows into a trunk of like type, replacing both said trunks by a single trunk of the current type.

3. The method of claim 2, wherein the rounding phase results in each surviving trunk (k,e) having a value of 1 for the corresponding investment variable, and every eliminated trunk having the value 0 for the corresponding investment variable.

4. The method of claim 3, further comprising, after the rounding phase, routing demand from the end nodes over the surviving trunks to the core network.

5. The method of claim 4, wherein the step of routing demand over surviving trunks is carried out such that all of the demand from each end node is assigned to one particular route, whereby:

for each end node i, the usage variables $y_{k,i}^e$ for each trunk (k,e) on the assigned route from said end node are set to 1; and for each end node i, all other usage variables $y_{k,i}^e$ are set to 0.

6. The method of claim 5, wherein the demand from each end node is assigned to that route which incurs the least service charge.

7. The method of claim 6, wherein the buying stage comprises:

a) classifying paths from each end node to the core network as long paths or short paths according to the total service charge of sending one unit of demand from said end node to the core network on said paths; and b) eliminating trunks of the current type that lie only on long paths.

8. The method of claim 7, wherein a path from a given end node is classified as short if it can carry all of the demand from the given end node to the core network for a service charge less than twice the total service charge incurred when all available paths are used.

9. The method of claim 8, wherein:

a) the buying stage comprises grouping end nodes into groups of leader nodes and follower nodes, each said group including precisely one leader node;

b) the follower nodes to be grouped with each leader node are selected according to a rule that relates to the node, to be referred to as the base node, through which a short path from the leader enters a trunk of the current type;

c) unless a given node already belongs to a different group, said rule makes the given node a follower if a short path from the given node passes through the base node; and d) only one trunk of the current type is retained for each said group.

10. The method of claim 9, wherein the buying stage further comprises selecting for retention a trunk of the current type having a least overhead charge.

11. The method of claim 1, wherein:

a) the input information further includes locations of prospective nodes of the core network;

b) the provisional solution to be obtained by solving the linear program further comprises a set of continuously valued core variables, each said core variable specifying a level of investment in a core node; and c) the rounding phase further comprises rounding each core variable to 0 or 1, thereby to indicate, by each rounded value 1, a location for installing a core switch.

* * * * *